US011384787B2

(12) United States Patent
Dorman et al.

(10) Patent No.: US 11,384,787 B2
(45) Date of Patent: Jul. 12, 2022

(54) COMPOSITE VEHICLE DRIVESHAFT WITH CRASH COLLAPSE SYSTEM

(71) Applicant: Composite Drivelines, LLC, West Allis, WI (US)

(72) Inventors: James Lee Dorman, West Allis, WI (US); Kai-Peter Berndt, Oak Creek, WI (US); Anthony D. Stefanelli, Elkhorn, WI (US); Gregg Piper, Wauwatosa, WI (US)

(73) Assignee: Composite Drivelines, LLC, West Allis, WI (US)

( * ) Notice: Subject to any disclaimer, the term of this patent is extended or adjusted under 35 U.S.C. 154(b) by 436 days.

(21) Appl. No.: 16/373,326

(22) Filed: Apr. 2, 2019

(65) Prior Publication Data

US 2019/0301520 A1 Oct. 3, 2019

Related U.S. Application Data

(60) Provisional application No. 62/652,011, filed on Apr. 3, 2018.

(51) Int. Cl.
*F16C 3/03* (2006.01)
*F16D 3/06* (2006.01)
*F16C 3/02* (2006.01)

(52) U.S. Cl.
CPC .............. *F16C 3/03* (2013.01); *F16C 3/026* (2013.01); *F16D 3/06* (2013.01); *F16C 2326/06* (2013.01); *Y10T 403/473* (2015.01); *Y10T 403/7033* (2015.01)

(58) Field of Classification Search
CPC ........ F16C 3/03; F16C 3/026; F16C 2326/06; F16D 3/06; F16D 2250/0069; F16D 1/0858; F16D 2001/103; F16D 1/068; Y10T 403/473; Y10T 403/7033
USPC .................................. 464/181, 182; 280/777
See application file for complete search history.

(56) References Cited

U.S. PATENT DOCUMENTS

| 2,399,103 A * | 4/1946 | Clinedinst ............. F16L 13/103 |
| | | 156/304.2 |
| 4,421,497 A | 12/1983 | Federmenn et al. |
| 4,722,717 A | 2/1988 | Salzman et al. |
| 5,087,147 A | 2/1992 | Petrzelka et al. |

(Continued)

FOREIGN PATENT DOCUMENTS

| JP | 05215119 | 8/1993 |
| JP | 2017095035 | 6/2017 |

*Primary Examiner* — Greg Binda
(74) *Attorney, Agent, or Firm* — Boyle Fredrickson S.C.

(57) ABSTRACT

A composite vehicle driveshaft is provided with a crash collapse system that allows for a controlled longitudinal collapse of the driveshaft by facilitating telescopic movement of various components with respect to each other during a crash event. The crash collapse system may include a collapsible joint with a sleeve that is concentrically bonded in an end of a composite tube and a stub end assembly that is spline-engaged and interference fit within the sleeve, such as by way of a press-fit and/or a thermal shrink-fit procedure. This relationship may rotationally lock and axially fix the stub end assembly to the sleeve unless, during a crash event, the composite vehicle driveshaft experiences a compression or push-type force that exceeds a minimum breakaway or collapse force value that longitudinally and telescopically collapses the composite vehicle driveshaft.

19 Claims, 7 Drawing Sheets

(56) References Cited

U.S. PATENT DOCUMENTS

| | | | |
|---|---|---|---|
| 5,118,214 A | 6/1992 | Petrzelka et al. | |
| 5,320,579 A | 6/1994 | Hoffmann | |
| 5,421,781 A | 6/1995 | Mackellar | |
| 5,601,494 A | 2/1997 | Duggan | |
| 6,190,263 B1 * | 2/2001 | Kimoto | F16C 3/026 464/181 |
| 6,193,612 B1 | 2/2001 | Craig et al. | |
| 6,682,436 B2 | 1/2004 | Kimoto et al. | |
| 6,692,365 B2 | 2/2004 | Suzuki et al. | |
| 7,288,029 B1 | 10/2007 | Lyon et al. | |
| 7,442,127 B2 | 10/2008 | Kai et al. | |
| 7,485,045 B2 | 2/2009 | Williams | |
| 7,488,257 B1 | 2/2009 | Booker et al. | |
| 7,946,924 B2 | 5/2011 | Neugebauer et al. | |
| 8,597,131 B2 | 12/2013 | Pisinger | |
| 8,715,093 B2 | 5/2014 | O'Neil et al. | |
| 2013/0294824 A1 | 11/2013 | Pisinger | |
| 2016/0123378 A1 | 5/2016 | Mintzlaff et al. | |
| 2017/0051791 A1 | 2/2017 | Leko et al. | |

* cited by examiner

COMPOSITE VEHICLE DRIVESHAFT WITH CRASH COLLAPSE SYSTEM

CROSS-REFERENCE TO RELATED APPLICATIONS

This application claims the benefit of U.S. Provisional Patent Application No. 62/652,011, filed Apr. 3, 2018, hereby incorporated by reference in its entirety.

FIELD OF THE INVENTION

The invention relates generally to vehicle propel shafts or driveshafts that are made from composite materials. The invention additionally relates to a composite vehicle driveshaft with a crash collapse system that allows the driveshaft to collapse in a controlled manner during a crash.

BACKGROUND OF THE INVENTION

Composite driveshafts are available, which have resulted from efforts to provide weight reduction for rotating assemblies. Applications of composite driveshafts include stationary power transmission applications, such as transmitting torque for operating pumps and other industrial-type uses.

Vehicles typically have driveshafts, but composite driveshafts have not been widely implemented for vehicle use. Numerous substantial challenges are faced when trying to implement composite driveshaft concepts from, for example, stationary power transmission applications into non-stationary applications. Vehicle driveshafts operate in substantially different use environments than stationary driveshaft applications. Compared to stationary driveshaft applications, vehicle driveshafts operate in heat envelopes that present higher temperatures and greater temperature variations, operate at greater rotational speeds and with greater rotational speed variations, experience different types of loading such as greater shock-loads and/or other extreme torque spikes, and are subject to stricter diameter and other size constraints. Efforts to increase the strength of composite driveshafts to address these issues can present yet other issues. One example is that, despite their light weight, composite driveshafts can have substantial columnar strength and can cause collateral damage to other vehicle components during a crash due to the compressive-type push forces that are transferred through the driveshafts.

SUMMARY OF THE INVENTION

In accordance with a first aspect of the invention, a composite vehicle driveshaft is provided that allows for a controlled longitudinal collapse by facilitating telescopic movement of various components with respect to each other during a crash event in which the composite vehicle driveshaft is subjected to compressive or longitudinal pushing forces that overcome corresponding component longitudinal fixation forces between those components.

In accordance with another aspect of the invention, the composite vehicle driveshaft includes a composite tube that has opposed tube ends, and a tube sidewall that extends longitudinally or axially between the tube ends. A crash collapse system can reduce a length of the composite vehicle driveshaft during a crash event that applies sufficient force to the driveshaft. The crash collapse system may include a stub end assembly arranged at an end of the composite tube. The stub end assembly includes a stub shaft that extends longitudinally beyond and is locked into rotational unison with the end of the composite tube. The crash collapse system is configured to longitudinally or axially fix the stub shaft relative to the composite tube until a longitudinal pushing force of sufficient magnitude, which corresponds to a minimum breakaway or collapse force value, is applied against the composite vehicle driveshaft. When this happens, the crash collapse system allows the stub shaft to longitudinally retract at least partially into the composite tube.

The crash collapse system may include a sleeve arranged at a sleeve-end of the composite tube. The stub shaft and the sleeve engage each other to define a collapsible joint that is configured to allow the telescopic collapsing movement of the stub shaft into the sleeve and composite shaft during the crash event. The sleeve may be arranged concentrically within and be bonded to the sleeve-end of the composite tube, such as by way of an adhesive.

In accordance with another aspect of the invention, the sleeve may define a sleeve inner circumferential surface with splines that define a sleeve splined segment. The stub shaft may include a stub shaft base with an outer circumferential surface that has splines that define a stub shaft base splined segment. The splines of the sleeve and stub shaft may be, for example, straight or helical and correspond to each other to allow their splined engagement. The sleeve and stub shaft base splined segments engage each other to lock them into rotational unison with each other while allowing the telescopic movement of the collapsible joint during the crash event. The engaged sleeve and stub shaft base segments may provide an interference fit between each other at the collapsible joint to longitudinally or axially fix the stub shaft with respect to the composite tube when in the extended state. The interference fit between the stub shaft base and the sleeve may be formed by a press-fit and/or a thermal shrink-fit procedure. The interference fit may also be applied to the splined interfaces of the stub shaft and the sleeve to avoid any backlash between teeth/splines of the stub shaft base and sleeve. Without such interference fit, the corresponding shoulder/collar surfaces of the stub shaft and the sleeve could experience backlash that would increase the risk of part wear at their interface(s).

In accordance with another aspect of the invention, the stub shaft base may include a locating collar that is housed in a guide chamber of the sleeve. The locating collar may be inboard of the splines of the stub shaft base splined segment. A shoulder of the sleeve may extend radially into the sleeve cavity between the guide chamber and splined chamber and may provide a mechanical stop against which the locating collar abuts to prevent extension-type withdrawal of the stub shaft through an outer or front end of the sleeve. A seal, such as an o-ring, may be arranged at the sleeve outer end between the sleeve and the stub shaft to create a barrier between the front or outer end of the splined chamber and the outside. The o-ring may be seated in a groove that extends into at least one of an inner circumferential surface of the sleeve and an outer circumferential surface of the stub shaft base.

In accordance with another aspect of the invention, an adhesive injection passage is provided that is configured to direct an adhesive into the annular cavity during an adhesive injection procedure. The adhesive injection passage may include an adhesive inlet that is configured to receive a volume of adhesive. An axial passage segment extends longitudinally through at least a portion of the sleeve circumferential sidewall and directs the adhesive from the adhesive inlet in a downstream direction. A radial release passage segment extends radially from the axial passage segment to the annular cavity to release the adhesive into the cavity for bonding the sleeve and composite tube to each other.

In accordance with another aspect of the invention, the sleeve may include a sleeve outer flange that is arranged longitudinally outward of the composite tube. An adhesive inlet radial passage may extend radially through the sleeve outer flange from the adhesive inlet to the axial passage segment.

In accordance with another aspect of the invention, the sleeve may include a bleed passage that is configured to release air or other contents from the annular cavity during an adhesive injection procedure during which the annular cavity is filled with adhesive. The bleed passage may include an axial passage segment that extends longitudinally through at least a portion of the sleeve circumferential sidewall, a radial passage segment that extends radially between the axial passage segment and the annular cavity, and an outlet that connects the axial passage segment to the ambient for venting or bleeding contends out of the annular cavity and bleed passage during the adhesive injection procedure.

Figure 1:
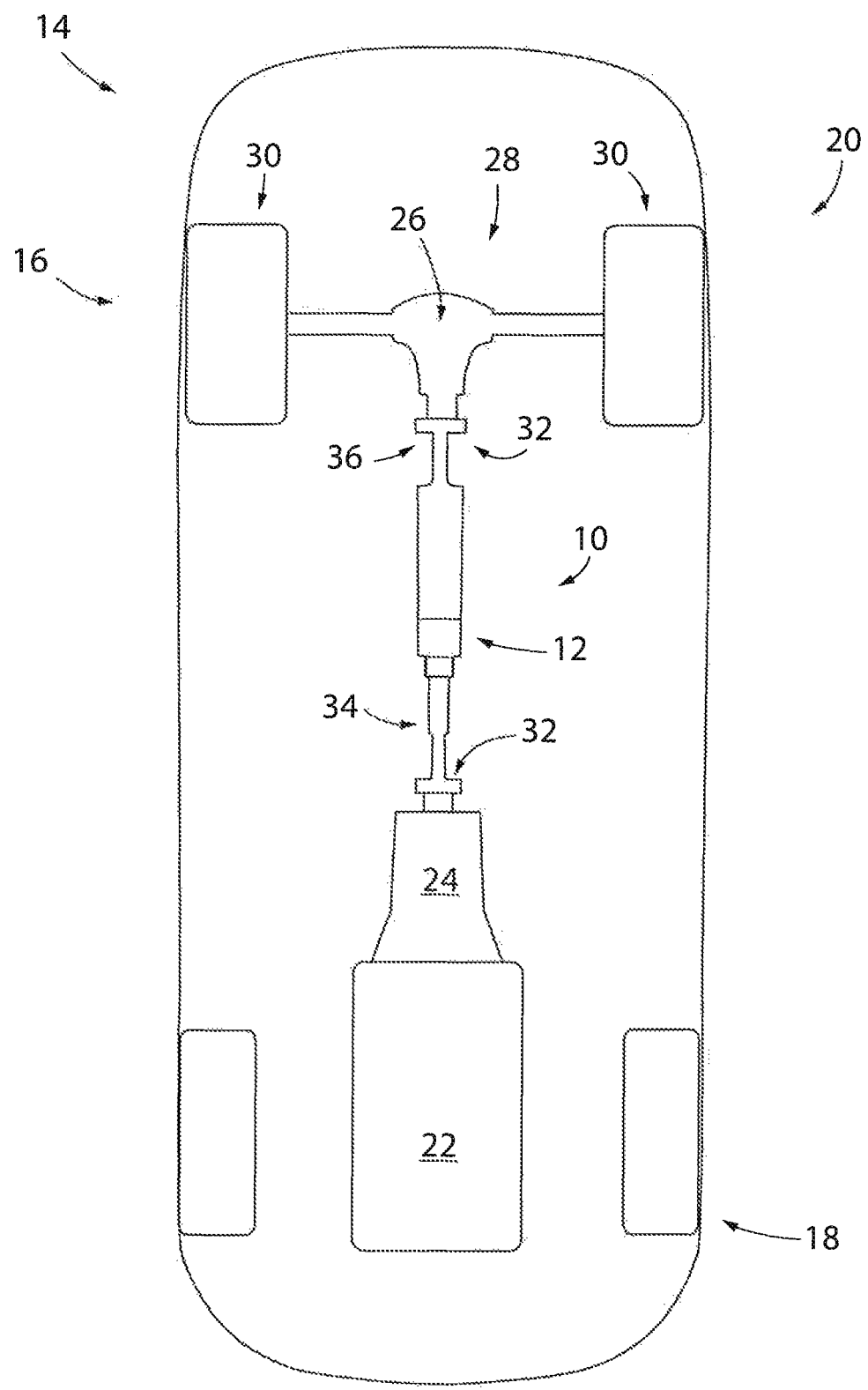
FIG. 1 schematically illustrates a vehicle with a composite vehicle driveshaft with a crash collapse system in accordance with an aspect of the invention.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE PREFERRED EMBODIMENTS

Referring now to the drawings and initially to FIG. 1, a composite vehicle driveshaft 10 with a crash collapse system 12 is shown implemented in a vehicle 14, represented here as an automobile 16. Automobile 16 has front and rear ends 18, 20 and a powertrain that includes a prime mover such as engine 22. Transmission 24 receives power from the engine 22 and delivers it downstream through the composite vehicle driveshaft 10 to a differential 26 that delivers the power through a drive axle 28 to a pair of drive wheels 30. A pair of CV (constant velocity) joints 32 is shown respectively connecting the driveshaft front end 34 to the transmission 24 and the driveshaft rear end 36 to the differential 26. It is understood that instead of the transmission 24 and differential 28, the composite vehicle driveshaft 10 may instead transmit power from the engine 22 to a transaxle that combines a transmission and drive axle. Regardless of the particular configuration of automobile 16, the crash collapse system 12 is configured to allow the composite vehicle driveshaft 10 to collapse in a controlled manner by facilitating telescopic movement of various components with respect to each other when sufficient compressive or push forces are applied to the composite vehicle driveshaft 10 during a crash event.

Figure 2:
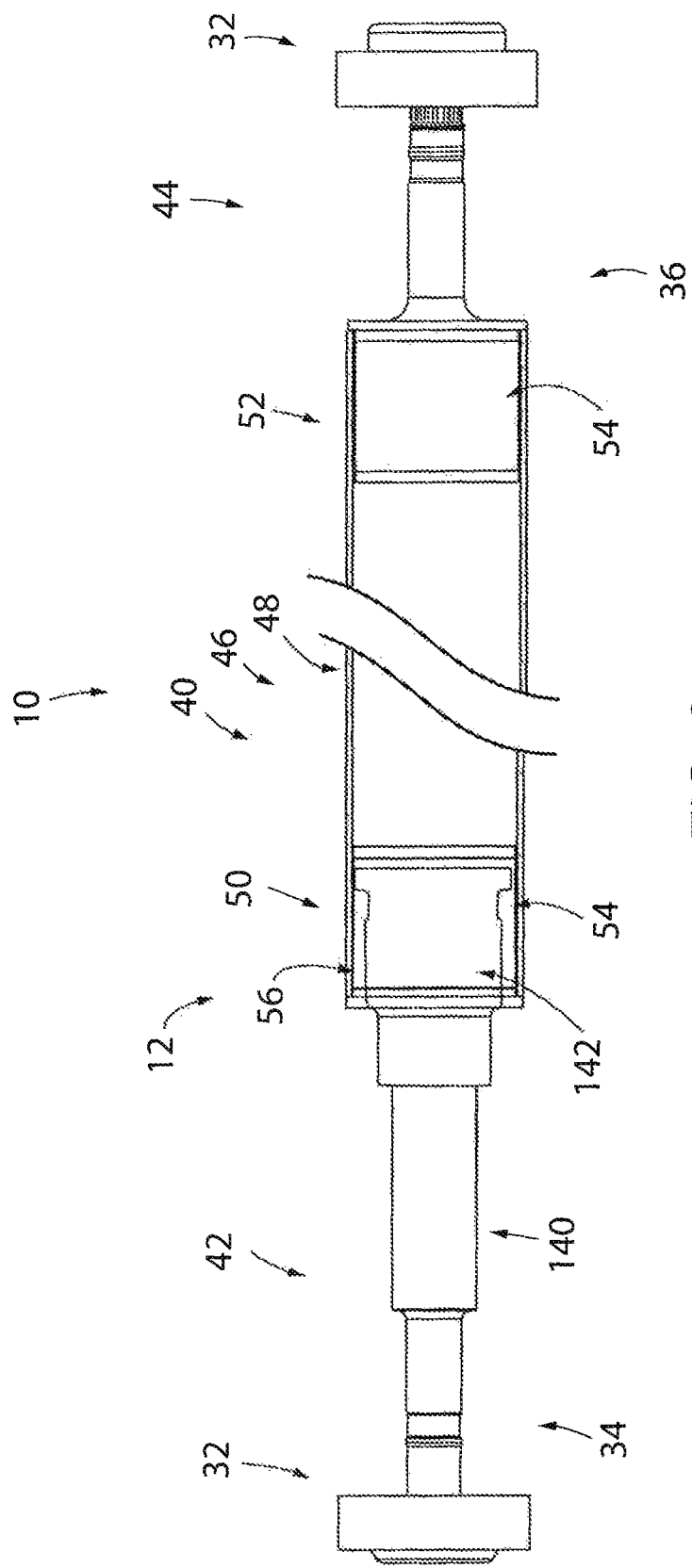
FIG. 2 schematically illustrates a partially cross-sectional side elevation view of a composite vehicle driveshaft with a crash collapse system in accordance with an aspect of the invention.

Referring now to FIG. 2, composite vehicle driveshaft 10 includes a composite tube 40 that defines an intermediate portion of the composite vehicle driveshaft 10 and from which a pair of shaft end assemblies extend, shown here as front and rear stub end assemblies 42, 44. The front and rear stub end assemblies 42, 44 at least partially define and extend between the driveshaft front and rear ends 34, 36 to transmit torque from the CV joint 32 at the driveshaft front end 34 to the CV joint 32 at the driveshaft back end, in this illustrated embodiment.

Still referring to FIG. 2, composite tube 40 may be a cylindrical hollow tube made from a composite material(s), including fibrous and resin materials components. Composite tube 40 has a body 46 with a circumferential tube sidewall 48 that defines a pair of ends, shown as front and rear tube ends 50, 52. The composite tube 40 may be a product of a filament winding process. The filament winding process may include wrapping or winding a filament(s) or string(s), for example, single fiber strings that are soaked in a resin around a steel or other sufficiently rigid core or mandrel. The fiber soaking may provide a wet laminate or the fiber(s) may be pre-soaked in a resin to provide what is sometimes referred to in the industry as "pre-preg materials". Regardless of the particular fiber soaking procedure, after the filament winding process, the wound filament(s) or wound tubular product is then oven-heat cured. The fibers may include, for example, carbon fiber and/or fiberglass fibers. Regardless of the particular configuration of composite tube 40, its front and rear tube ends 50, 52 are shown here bonded to the front and rear stub end assemblies 42, 44. The bonding may connect components made of dissimilar materials to each other. This allows a non-metallic component, such as the composite tube 40, to provide a substantial or majority portion of the length of the composite vehicle driveshaft 10 while also providing metallic component connections through the joints at the interfaces between the driveshaft front and rear ends 34, 36 and the transmission 24 and differential 28.

Still referring to FIG. 2, each of the front and rear stub end assemblies 42, 44 has a base 54 that may be made from a metallic material and is bonded to the respective front and rear tube ends 50, 52, such as by way of an injectable adhesive. After injection, the adhesive cures to faun the bond(s) between the metallic material of base 54 and the non-metallic composite material of the composite tube 40. The bases 54 are shown as cylindrical or tubular with outer circumferential surfaces that are bonded to an inner surface of the composite tube 40. Base 54 at the front tube end 50 is shown here as a sleeve 56 of the crash collapse system 12 that is bonded to the front tube end 50 and holds the front stub end assembly 42 in a normally longitudinally or axially fixed extended position, while permitting the front end stub assembly 42 to collapse in a controlled manner. The controlled collapse may be, for example, a telescopic collapse of the front stub end assembly 42 into the composite tube 40 during a crash event, discussed in greater detail elsewhere herein. It is understood that base 54 at the tube rear end 52 may instead incorporate the crash collapse system 12 or both bases 54, and the front and rear tube ends 50, 52 may incorporate selectively telescoping assemblies of crash collapse systems 12.

Figure 3:
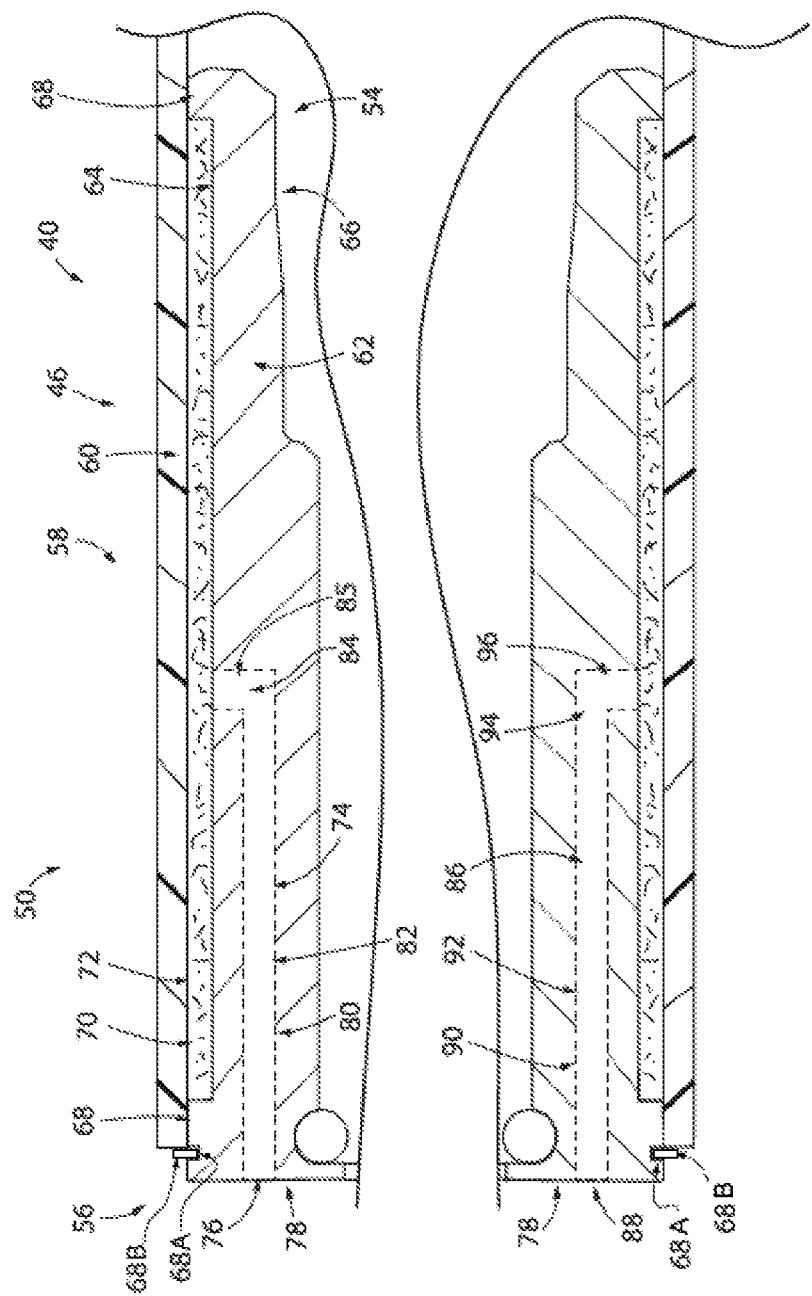
FIG. 3 schematically illustrates a partially cross-sectional side elevation view of a portion of a composite vehicle driveshaft with a crash collapse system in accordance with an aspect of the invention.

Referring now to FIG. 3, portions of sleeve 56 are shown here to represent a bonded connection of the sleeve 56 or other base 54 to the composite tube 40, with the sleeve 56 fit concentrically in the front tube end 50 so that it defines a sleeve-end 58 of the composite tube with an inner circumferential surface 60 that faces toward the sleeve 56. Sleeve 56 may be a steel or an aluminum, such as an anodized aluminum, tubular member with a circumferential sidewall 62 with opposite outer and inner circumferential surfaces 64, 66. A pair of lands 68 extend radially outward from the outer circumferential surface 64, with the lands 68 longitudinally spaced from each other along the sleeve 56. The lands 68 engage the tube inner circumferential surface 60 through a snug fit, which may be an interference fit that requires press-assembly, that ensures concentricity of the sleeve 56 within the composite tube 40 by coaxially locating the sleeve within the composite tube 40 in a manner that prevents radial offset or angular tilting of the sleeve 56 with respect to a longitudinal axis of the tube 40. The sleeve 56 may be pressed less than entirely into the tube 40, for example, with some of the outer land 68 protruding somewhat from the outer end of tube 40, as shown in FIG. 3. A groove 68A may extend radially into the outer land 68 and be configured hold a retainer such as a snap-ring 68B. The snap-ring 68B may abut an outer edge or end surface of the tube 40 to optionally longitudinally or axially register the sleeve 56 and tube 40 with respect to each other. Other retainers or intermediate engaging structures such as an O-ring or the like may engage both the sleeve 56 and the tube 40, if longitudinal or axial registration is desired. However, longitudinal or axial registration of the sleeve 56 and tube 40 is not essential, so the sleeve may be simply pressed into the tube 40 and located with the pressing tool(s), without any such ancillary retainer, seal, or other component. In one example, the sleeve 56 may be pressed substantially fully into the tube 40 to provide a flush or nearly flush end-fit of the sleeve 56 in the tube 40. Regardless of the particular relative arrangement of the ends of the sleeve 56 and tube 40 with respect to each other, the concentric arrangement of the sleeve 56 within the composite tube 40 creates a space or annular cavity 70 between the tube inner circumferential surface 60 and the sleeve outer circumferential surface 64 that is filled with an adhesive 72 to bond the sleeve 56 to the composite tube 40. The adhesive 72 may be any of a variety of industrial, aerospace, or other suitable adhesives, epoxies, or other bonding agents, such as a suitable methacrylate adhesive or various one available from 3M® under Scotch-Weld™ and various other tradenames. The bond between the sleeve 56 and composite tube 40 may allow for suitable automotive applications, including high performance vehicle applications that require driveshafts with high torque capacities. The bonding strength between the sleeve 56 and composite tube 40 may provide torque capacities within a range of at least about 300 lb./ft of torque capacity up to about 80,000 to 100,000 lb./ft of torque capacity of the composite vehicle driveshaft 10 without bond failure between the sleeve 56 and composite tube 40.

Still referring to FIG. 3, the adhesive 72 is introduced to fill the cavity 70 during an adhesive injection procedure. A multi-segmented passage, shown as an adhesive injection passage 74, guides the adhesive 72 from an adhesive injection tool (not shown) into the cavity 70. The adhesive injection passage 74 is shown here with an adhesive inlet 76 that defines an opening through an outwardly facing end surface 78 of the sleeve 56. Adhesive injection passage 74 includes an axial injection passage segment 80, which is shown as a bore 82 that extends longitudinally through a portion of the sleeve circumferential sidewall 62. A radial release passage segment 84 is shown as a bore 85 that extends from an end of the axial injection passage segment 80 to the cavity 70, radially through the sleeve circumferential sidewall 62.

Still referring to FIG. 3, air is vented or released from cavity 70 during the adhesive injection procedure through a bleed passage, which may be a multi-segmented passage, shown here as a bleed passage 86 that may be identical to but circumferentially spaced from the adhesive injection passage 74. Bleed passage 86 includes a bleed outlet 88 that is shown defining an opening through the outwardly facing sleeve end surface 78 that connects and vents the bleed passage 86 to the ambient. Bleed passage 86 includes an axial bleed passage segment 90, which is shown as a bore 92 that extends longitudinally through a portion of the sleeve circumferential sidewall 62. A radial bleed passage segment 94 is shown as a bore 96 that extends from an end of the axial bleed passage segment 90 to the cavity 70, radially through the sleeve circumferential sidewall 62. The adhesive injection passage 74 and bleed passage 86 may be peripherally offset from one another by 180° to optimize bleeding from the cavity 70 and thus adhesive filling of the cavity 70. Alternatively, or instead of this arrangement, two or more opposed bleed passages could be provided that are each spaced about 150° to 175° from the adhesive injection passage 74.

Figure 4:
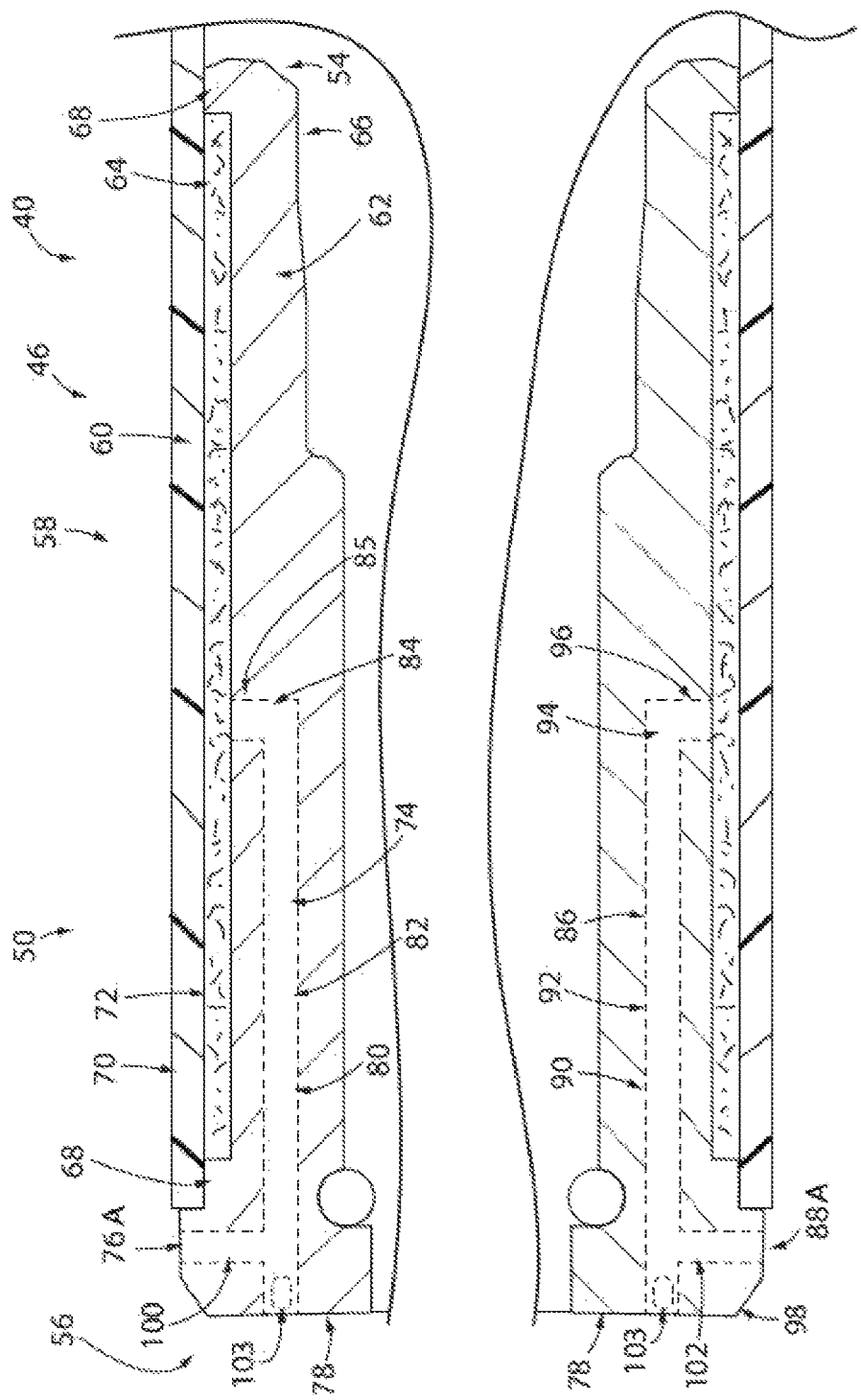
FIG. 4 schematically illustrates a partially cross-sectional side elevation view of a portion of another composite vehicle driveshaft with a crash collapse system in accordance with an aspect of the invention.

Referring now to FIG. 4, the adhesive injection passage 74 and bleed passage 86 are substantially the same as those shown in FIG. 3. Instead of the adhesive inlet 76 and bleed outlet 88 located at the sleeve end surface 78 and facing an axial outward direction with respect to the sleeve 56, they are arranged facing radially outward from the sleeve 56 and are shown here as adhesive inlet 76A and bleed outlet 88A. Sleeve 56 of FIG. 4 is shown with a different configuration than that shown in FIG. 3. Sleeve 56 of FIG. 4 is shown with an optional flange 98 that is arranged longitudinally outward of the composite tube 40. An adhesive inlet radial passage 100 extends radially through the flange 98, between the adhesive inlet 76A and the axial injection passage segment 80. A bleed outlet radial passage 102 extends radially through the flange 98, between the bleed outlet 88A and the axial bleed passage segment 90. The opening on the sleeve end surface 78 will then get closed by a closure represented as closure plug 103, which may be a weld or plug device such as press fit or screw-in plug that prevents adhesive from flowing into the ambient prior to filling the cavity 70.

Figure 5:
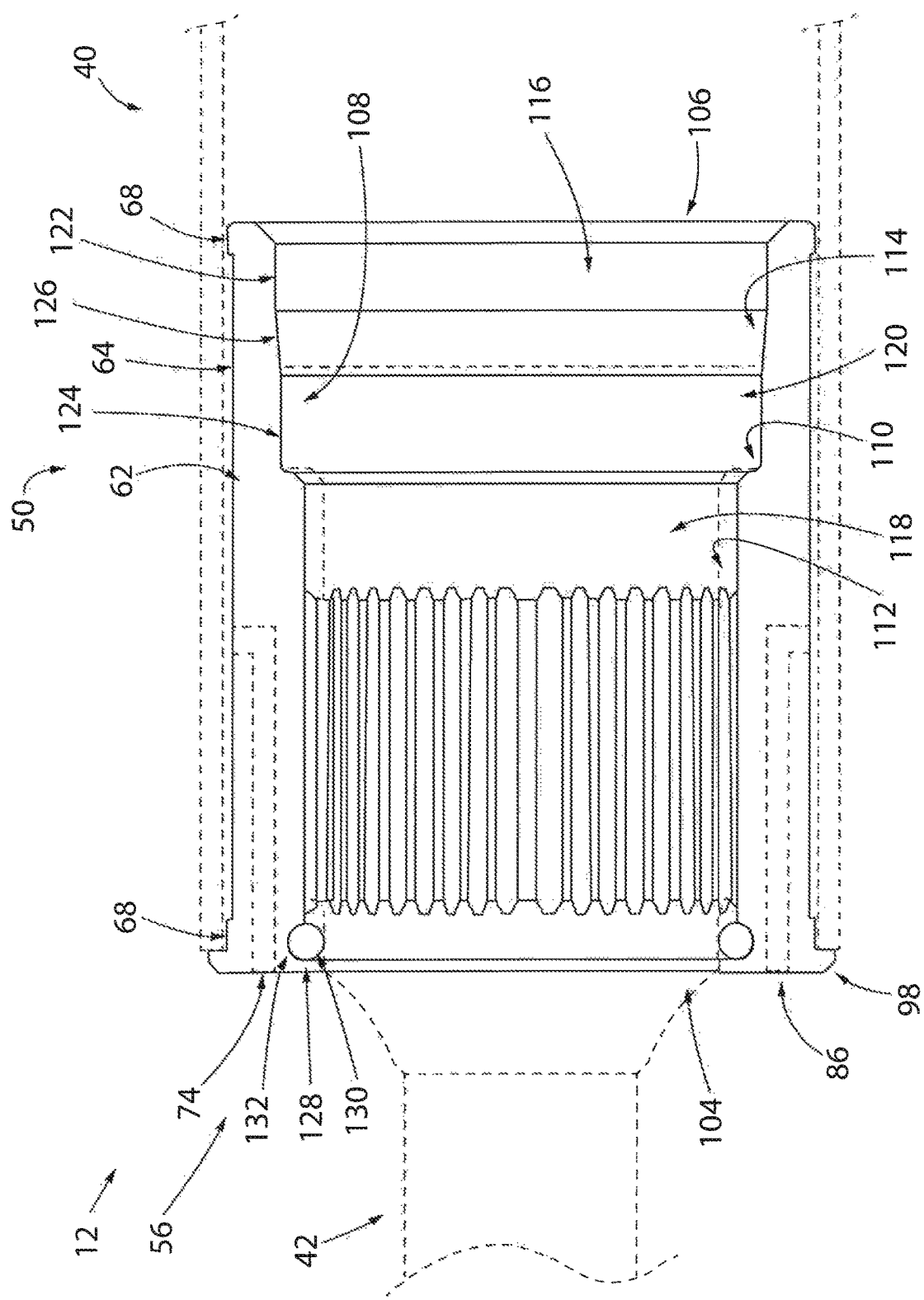
FIG. 5 schematically illustrates a partially cross-sectional side elevation view of a portion of another composite vehicle driveshaft with a crash collapse system in accordance with an aspect of the invention.
Figure 6:
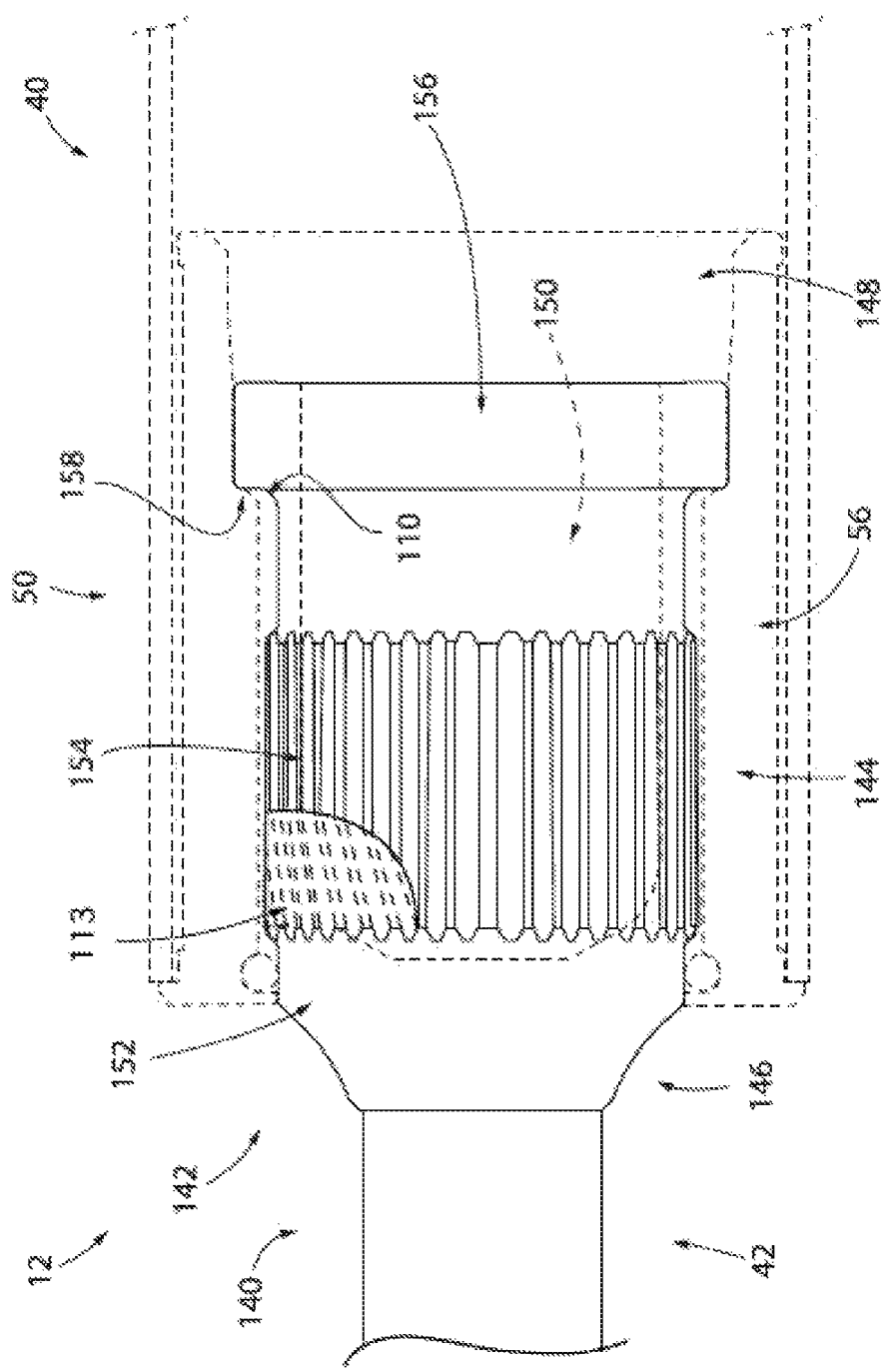
FIG. 6 schematically illustrates a partially cross-sectional side elevation view of a portion of another composite vehicle driveshaft with a crash collapse system in accordance with an aspect of the invention.

Referring now to FIG. 5, sleeve 56 is shown here as hollow, with an outer end opening 104 and an inner end opening 106 and multiple interior segments that are axially adjacent each other that are defined by different diameters or steps along a sleeve inner circumferential surface 108. A shoulder 110 is defined at the inner circumferential surface 108 between splined and non-splined segments 112, 114. Shoulder 110 separates a cavity or space as a sleeve interior 116 into a splined chamber 118 that corresponds in location to the splined segment 112 toward the front or outer ends of sleeve 56 and a guide chamber 120 that corresponds in location to the non-splined segment 114 toward the back or inner end of sleeve 56. The splines of the splined segment 112 are shown here as straight splines, although it is understood that the splines may have other configurations. For example, the splines may be helical, such as those shown in helical splined segment 113 (FIG. 6). The guide chamber 120 is shown with multiple segments including a larger diameter segment 122 spaced from the splined segment 112, a smaller diameter segment 124 adjacent the splined segment 112, and the transitional segment 126 that presents a sloped surface transitioning from the larger diameter segment 122 to the smaller diameter segment 124. The sleeve interior 116 is sealed at the back or inner end of the sleeve 56 through the bonded connection of the sleeve 56 with the composite tube 40, with the inner end opening 106 facing into the interior of the composite tube 40. The sleeve interior 116 may be sealed at the front or outer end of the sleeve 56 with a seal 128, shown here as oaring 130 that is seated in a groove 132 in the sleeve inner circumferential surface 108. O-ring 130 is compressed to seal between the groove 132 and a surface of the front stub end assembly 42 to provide the seal which keeps water and debris out of the splines of splined chamber 118.

Referring now to FIG. 6, front stub end assembly 42 may be a steel or other metallic elongate member that includes a stub shaft 140 toward the front of the front stub end assembly 42 that is connected to the CV joint 32 (FIG. 2), and a stub shaft base 142 that is housed in the sleeve 56. Stub shaft base 142 defines a body 144 with a front end 146 that is connected to the stub shaft 140 and shown here extending axially out from the sleeve 56. Front end 146 presents a smooth or non-splined outer circumferential surface that engages the o-ring 130 (FIG. 5) to seal the front of the sleeve interior 116 (FIG. 5). A back end 148 of stub shaft base 142 is arranged axially farthest into the sleeve 56. Stub shaft base 142 is shown here with a hollow configuration provided by a pocket or void 150 that extends into the back end 148, toward the front end 146. At the exterior of the shaft base 142, an outer circumferential surface 152 defines a splined segment 154 with splines that are arranged toward the front end 146. The splines of the splined segment 154 are shown here as straight splines, although it is understood that the splines may have other configurations. For example, the splines may be helical. Regardless of the particular configuration of the spines at splined segment 154, they correspond to and are configured to engage the splines of the sleeve splined segment 112 (FIG. 5) to form a splined connection between the sleeve 56 and stub shaft base 142 to lock them into rotational unison with no backlash with each other while permitting relative axial movement of the sleeve 56 and the stub shaft base 142, in the event of a crash. This splined engagement may also allow for high torque capacity of the composite vehicle driveshaft 10 of, for example, a torque capacity of up to about 80,000 to 100,000 lb./ft or torque, like that provided by the strength of bonding between the sleeve 56 and composite tube 40.

Still referring to FIG. 6, a locating collar shown as collar 156 is arranged toward the back end 148 and is shown here with a larger diameter than the remainder of the stub shaft base 142. The collar 156 is housed in the sleeve guide chamber 120 (FIG. 5) and has a forward-facing surface 158 that abuts the shoulder 110 of the sleeve 56. The sleeve shoulder 110 provides a mechanical stop against which the collar 154 abuts to prevent extension-type withdrawal of the stub shaft 140 through the sleeve outer end opening 104 (FIG. 5).

Figure 7:
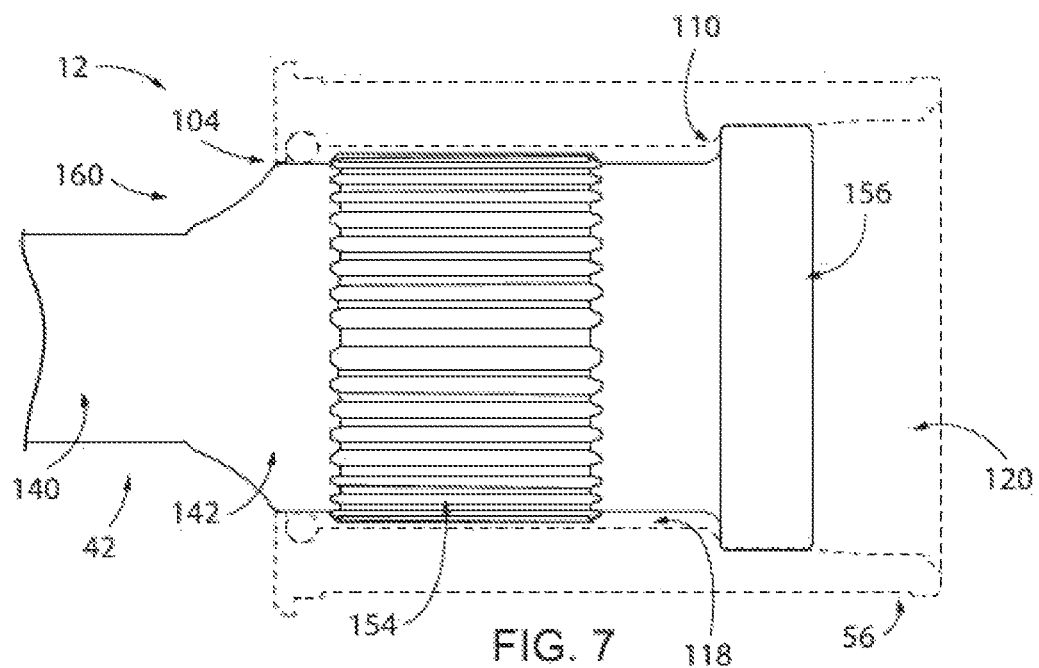
FIG. 7 schematically illustrates a partially cross-sectional side elevation view of a portion of another composite vehicle driveshaft with a stub end assembly in a first, seated, position.
Figure 8:
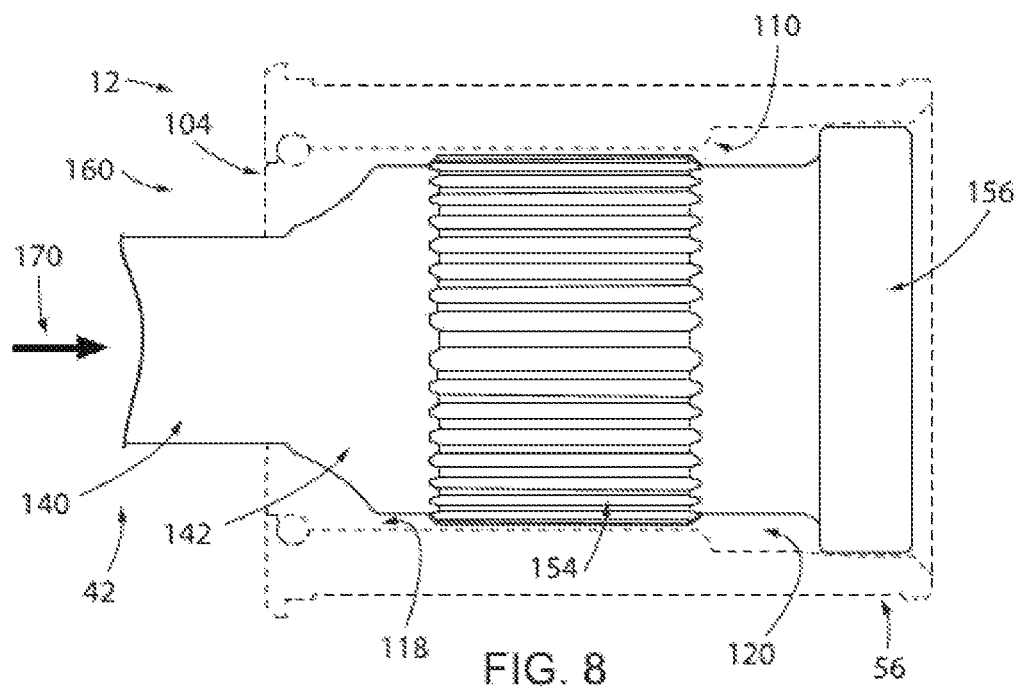
FIG. 8 schematically illustrates a partially cross-sectional side elevation view of the portion of the composite vehicle driveshaft with a stub end assembly of FIG. 7 in a second, unseated, position.

Referring now to FIGS. 7-8, the concentric engagement of stub shaft base 142 within sleeve 56 provides a collapsible joint 160 of the crash collapse system 12 that allows controlled release of the engagement and telescopic advancement of the front stub end assembly 42 at least partially into the composite tube 40 during a crash event. FIG. 7 shows the stub shaft 140 and collapsible joint 160 in a default extended state, with stub shaft base 142 axially advanced in a farthest position out of the sleeve outer end opening, with the collar 156 abutting the sleeve shoulder 110. In the default extended state, the sleeve 56 and stub shaft base segment 142 may provide an interference fit between each other at the collapsible joint 160 to longitudinally or axially fix the stub shaft 140 with respect to the sleeve 56 and composite tube 40 (FIG. 6), whereby the stub shaft 140 does not freely axially slip into the sleeve 56 after assembly. The interference fit between the stub shaft base 142 and the sleeve 56 may be formed by a press-fit and/or a thermal shrink-fit procedure to assemble the collapsible joint 160. The interference fit may be defined between, for example, the engaging splines of the stub shaft base segment 142 and the sleeve 56, between the collar 156 and the guide chamber 120 of sleeve 56, or between both the splined engagement and the engagement between the collar 156 and surface(s) of the guide chamber 120. It is understood that besides splined coupling arrangements, the collapsible joint 160 may include other mechanisms that lock the stub shaft 140 and composite tube 40 into rotational unison with each other while permitting longitudinal sliding movement between components during a crash event that exceeds a minimum collapse threshold or break-away value to release such component(s) from its otherwise longitudinally fixed state. Such other mechanisms may include, for example, various tapered or other keyway and key arrangements that are circumferentially spaced about the collapsible joint 160 to provide rotational balance.

Referring now to FIG. 8, during a crash event, a longitudinal pushing force(s) may be applied against the composite vehicle driveshaft, as represented by the arrow 170. The stub shaft base segment 142 is shown moved away from the default extended position, with the collar 156 longitudinally unseated from the shoulder 110 and the splines of the stub shaft base splined segment 154 advancing along the splines of the sleeve splined chamber 118 toward the sleeve guide chamber 120. This type of movement is provided if the pushing force 170 is of sufficient magnitude so that it reaches or exceeds a minimum breakaway or collapse force value. Then, the stub shaft base 142 axially slides farther into the sleeve 56. This collapses the composite vehicle driveshaft 10 (FIG. 2) by allowing the front stub end assembly 42 to telescopically advance into the composite tube 40 (FIG. 2). The minimum breakaway or collapse force value may be within a range of between 100 lbs. to 20,000 lbs. of pushing force to longitudinally collapse the composite vehicle driveshaft 10 (FIG. 2) through the crash collapse system 12 at the collapsible joint 160, for example, configured to release and slide under impact loads of between about 100 lbs. to 5,000 lbs., between about 250 lbs. to 5,000 lbs., between about 500 lbs. to 5,000 lbs., between about 1,000 lbs. to 4,500 lbs. or between about 3,400 lbs. to 4,200 lbs. The particular minimum breakaway or collapse force value selected for a particular application may be determined based on, for example, various vehicle characteristics of the vehicle incorporating the composite vehicle driveshaft 10, such as vehicle weight and/or configuration, weight of various vehicle components and/or their configuration or locations within the vehicle.

Many changes and modifications could be made to the invention without departing from the spirit thereof. The scope of these changes will become apparent from the appended claims.

What s claimed is:

1. A composite vehicle driveshaft, comprising:
a composite tube having opposed first and second tube ends and that defines a tube sidewall that extends axially between the tube ends and that is made from a composite material and defines an inner circumferential surface;
a crash collapse system for reducing a length of the composite vehicle driveshaft during a crash event, the crash collapse system comprising:
a stub end assembly arranged at the first end of the composite tube and including:
a stub shaft that is locked in rotational unison with the composite tube, the stub shaft including a stub shaft outer end that extends longitudinally beyond the first end of the composite tube and a stub shaft base that is arranged concentrically within the first end of the composite tube;
a stop arranged within the crash collapse system concentrically inward of the inner circumferential surface of the composite tube and configured to prevent extension-type withdrawal of the stub shaft from the first end of the composite tube; and
wherein the crash collapse system is configured to axially fix the stub shaft relative to the composite tube when in a default extended state with the stop engaging the stub shaft base and to permit the stub shaft to longitudinally retract into the composite tube, moving the stub shaft base away from the stop, during a crash event that introduces a longitudinal pushing force against the composite vehicle driveshaft.

2. The composite vehicle driveshaft of claim 1, wherein the crash collapse system comprises a sleeve arranged at the first end of the composite tube to define a sleeve-end of the composite tube, and wherein the stub shaft and the sleeve engage each other to define a collapsible joint that is configured to allow telescopic movement of the stub shaft and the sleeve with respect to each other during the crash event.

3. The composite vehicle driveshaft of claim 2, wherein the sleeve is arranged concentrically within and is bonded to the sleeve-end of the composite tube.

4. The composite vehicle driveshaft of claim 3, wherein the sleeve defines a sleeve inner circumferential surface with splines that define a sleeve splined segment; and the stub shaft base defines an outer circumferential surface with splines that define a stub shaft base splined segment that engages the sleeve splined segment to lock the sleeve and the stub shaft into rotational unison with each other while allowing the telescopic movement of the collapsible joint during the crash event.

5. The composite vehicle driveshaft of claim 4, wherein the splines of the sleeve splined segment and the stub shaft base splined segment are straight splines.

6. The composite vehicle driveshaft of claim 4, wherein the splines of the sleeve splined segment and the stub shaft base splined segment are one of straight splines and helical splines.

7. The composite vehicle driveshaft of claim 4, wherein the collapsible joint defines an interference fit between the stub shaft base and the sleeve.

8. The composite vehicle driveshaft of claim 7, wherein the interference fit between the stub shaft base and the sleeve is provided by at least one of a press-fit and a thermal shrink-fit procedure.

9. The composite vehicle driveshaft of claim 1, wherein the stub shaft base defines a stub shaft base splined segment and a locating collar, and wherein
a sleeve is arranged concentrically within and bonded to the first end of the composite tube to define a sleeve-end of the composite tube, and wherein the sleeve defines a sleeve interior that includes,
a splined chamber at the sleeve splined segment that houses the stub shaft base splined segment; and
a guide chamber that houses the locating collar of the stub shaft base.

10. A composite vehicle driveshaft, comprising:
a composite tube having opposed first and second tube ends and that defines a tube sidewall that extends axially between the tube ends and that is made from a composite material;
a crash collapse system for reducing a length of the composite vehicle driveshaft during a crash event, the crash collapse system comprising:
a stub end assembly arranged at the first end of the composite tube and including:
a stub shaft that is locked in rotational unison with the composite tube, the stub shaft including a stub shaft outer end that extends longitudinally beyond the first end of the composite tube and a stub shaft base that is arranged concentrically within the first end of the composite tube;
a stop arranged within the crash collapse system and configured to prevent extension-type withdrawal of the stub shaft from the first end of the composite tube; and
wherein the crash collapse system is configured:
to axially fix the stub shaft relative to the composite tube when in a default extended state with the stop engaging the stub shaft base and to permit the stub shaft;
to longitudinally retract into the composite tube, moving the stub shaft base away from the stop, during a crash event that introduces a longitudinal pushing force against the composite vehicle driveshaft; and
so that the stub shaft remains axially fixed relative to the composite tube unless the longitudinal pushing force during the crash event exceeds a minimum collapse force value of at least 100 lbs. of force to permit the stub shaft to longitudinally retract into the composite tube during the crash event.

11. A composite vehicle driveshaft, comprising:
a composite tube having opposed first and second tube ends and that defines a tube sidewall that extends axially between the first and second tube ends and that is made from a composite material;
a crash collapse system for reducing a length of the composite vehicle driveshaft during a crash event, the crash collapse system comprising:
a stub end assembly arranged at the first end of the composite tube and including a stub shaft that extends longitudinally beyond the first end of the composite tube and that is locked in rotational unison with the composite tube;
wherein the crash collapse system is configured to axially fix the stub shaft relative to the composite tube when in a default extended state and to permit the stub shaft to longitudinally retract into the composite tube during a crash event that introduces a longitudinal pushing force against the composite vehicle driveshaft;
wherein the stub shaft includes a stub shaft base that defines a stub shaft base splined segment and a locating collar;
a sleeve arranged concentrically within and bonded to the first end of the composite tube to define a sleeve-end of the composite tube, and wherein the sleeve defines a sleeve interior that includes:
a sleeve inner circumferential surface with splines that define a sleeve splined segment;
a splined chamber at the sleeve splined segment that houses the stub shaft base splined segment; and
a guide chamber that houses the locating collar of the stub shaft base; and
wherein the sleeve defines inner and outer ends with the sleeve inner end arranged axially farther inside of the composite tube than the sleeve outer end, the sleeve further comprising a sleeve shoulder defined between the splined chamber and the guide chamber of the sleeve, and wherein the sleeve shoulder is configured to engage the locating collar of the stub shaft base to prevent withdrawal of the stub shaft through the sleeve outer end.

12. The composite vehicle driveshaft of claim 11, further comprising a seal arranged at the sleeve outer end between the sleeve and the stub shaft.

13. The composite vehicle driveshaft of claim 12, wherein the seal is an o-ring that is seated in a groove that extends into at least one of an inner circumferential surface of the sleeve and an outer circumferential surface of the stub shaft base.

14. A composite vehicle driveshaft, comprising:
a composite tube having opposed tube ends and that defines a tube sidewall that extends axially between the tube ends and that is made from a composite material;
a crash collapse system for reducing a length of the composite vehicle driveshaft during a crash event, the crash collapse system comprising:
a stub end assembly arranged at one of the ends of the composite tube and including a stub shaft that extends longitudinally beyond the respective end of the composite tube and is locked in rotational unison with the composite tube;
wherein the crash collapse system is configured to axially fix the stub shaft relative to the composite tube when in a default extended state and permit the stub shaft to longitudinally retract into the composite tube during a crash event that introduces a longitudinal pushing force against the composite vehicle driveshaft; and
a sleeve that is arranged concentrically within and bonded to the associated respective end of the composite tube, wherein the sleeve comprises:
a sleeve circumferential sidewall that defines an inner circumferential surface and an outer circumferential surface, wherein the inner circumferential surface faces toward the stub shaft and the outer circumferential surface faces toward the composite tube with an annular cavity defined between the composite tube and at least part of the outer circumferential surface of the sleeve circumferential sidewall;
an adhesive injection passage configured to direct an adhesive into the annular cavity during an adhesive injection procedure, wherein the adhesive injection passage includes:
an adhesive inlet that is configured to receive a volume of adhesive during the adhesive injection procedure;
an axial injection passage segment defining a bore that extends axially through at least a portion of the sleeve circumferential sidewall, wherein the axial injection passage segment is configured to receive the volume of adhesive from the adhesive inlet and convey the volume of adhesive in an axial direction relative to the sleeve circumferential sidewall during the adhesive injection procedure; and
a radial release passage segment defining a bore that extends radially through at least a portion of the sleeve circumferential sidewall to connect the axial injection passage segment to the annular cavity for directing and releasing the volume of adhesive from the axial passage into the annular cavity during the adhesive injection procedure.

15. The composite vehicle driveshaft of claim 14, wherein the sleeve comprises a sleeve outer flange that is arranged axially outward of the composite tube, and wherein the adhesive injection passage comprises an adhesive inlet radial injection passage segment that extends radially through the sleeve outer flange from the adhesive inlet to the axial injection passage segment.

16. The composite vehicle driveshaft of claim 15, wherein the bleed passage includes:
an axial bleed passage segment defining a bore that extends longitudinally through at least a portion of the sleeve circumferential sidewall;
a radial bleed passage segment defining a bore that extends radially through at least a portion of the sleeve circumferential sidewall to connect the axial bleed passage segment to the annular cavity; and
a bleed outlet that connects the axial bleed passage segment to the ambient.

17. The composite vehicle driveshaft of claim 16, wherein at least one of the axial injection passage segment and the axial bleed passage segment extends through an end surface of the sleeve to define an end face opening and a closure plug is arranged to close the end face opening of the sleeve end surface.

18. The composite vehicle driveshaft of claim 14, wherein the sleeve further comprises a bleed passage configured to release air from the annular cavity during the adhesive injection procedure.

19. A vehicle comprising:
a drive train including a composite vehicle driveshaft, wherein the composite driveshaft includes:
a composite tube having opposed tube ends and that defines a tube sidewall that extends axially between the tube ends and that is made from a composite material;
a crash collapse system for reducing a length of the composite vehicle driveshaft during a crash event, the crash collapse system comprising:
  a stub end assembly arranged at one of the ends of the composite tube and including:
    a stub shaft that extends longitudinally beyond the respective end of the composite tube and is locked in rotational unison with the composite tube;
    a sleeve concentrically housed in one of the ends of the composite tube, the sleeve having an interior space and a radially inwardly extending shoulder that separates the interior space into a first chamber and a second chamber; and
wherein the crash collapse system is configured to axially fix the stub shaft relative to the composite tube when in a default extended state with the shoulder of the sleeve providing a stop that engages the stub shaft between the first and second chambers of the sleeve interior space to prevent withdrawal of the stub shaft out of the composite tube and to permit the stub shaft to longitudinally retract into the composite tube during a crash event that introduces a longitudinal pushing force against the composite vehicle driveshaft.

\* \* \* \* \*